3,466,417
ARC WELDING ELECTRODES

Edwin Albert Chapman, Potters Bar, Ronald Leonard Bartlett, Cheshunt, and Brian Phelps, Roydon, near Harlow, Essex, England, assignors to Murex Welding Processes Limited, Waltham Cross, Hertfordshire, England, a British company
No Drawing. Filed June 10, 1966, Ser. No. 556,682
Int. Cl. B23k 9/16, 35/38
U.S. Cl. 219—74                                           11 Claims

ABSTRACT OF THE DISCLOSURE

A process for automatic or semi-automatic welding and an electrode for such welding for use with AC power supply at a current density in the range of 20,000 to 120,000 amperes per square inch. Disclosed is tubular electrode having a diameter in the range of .03 to .11 inch and consisting of a steel sheet enclosing a core containing deoxidizes in an amount of 1 to 4% and arc stabilizers in an amount of 10 to 36%, the arc stabilizers including at least 4% of rutile, at least ½% of an alkali metal oxide and at least 2% of an alkaline earth metal oxide, all the percentages being the percentages by weight of the electrode.

---

Manual flux coated arc welding electrodes can successfully be used with an A.C. power supply but solid wire or tubular electrodes, i.e. electrodes containing a core of flux and/or alloying elements, are at present used for automatic or semi-automatic welding with a D.C. power source. Such electrodes as at present available give poor results with an A.C. supply, even when used with $CO_2$ gas shielding, owing to instability of the arc, which leads to coarse spatter, frequent snapping out of the arc and stubbing of the electrode. The object of the present invention is to provide a process of automatic welding using A.C. current which avoids this difficulty.

The invention accordingly provides a process of automatic or semi-automatic welding which consists in utilizing in conjunction with $CO_2$ gas shielding and an A.C. power supply at a current density in the range of 20,000 to 120,000 amperes per square inch a continuous tubular electrode having a diameter in the range of 0.03 to 0.11 inch and consisting of a mild steel sheath enclosing a core containing deoxidisers in an amount of 1–4% and arc stabilizers in an amount of 10–36%, the arc stabilizers including at least 4% of rutile, at least ½% of an alkali metal oxide and at least 2% of an alkaline earth metal, all said percentages being percentages by weight of the electrode.

The arc stabilizers included in the core of the electrode may, subject to the above-stated minimum requirements of rutile and oxides of alkali and alkaline earth metals, consist of oxides of titanium, zirconium, magnesium, calcium, strontium, barium, sodium, potassium, rubidium, caesium and/or lithium or compounds or minerals which will decompose during welding to yield such oxides. The core will normally constitute 25–45% by weight of the electrode, but may in some cases constitute only 15%. Preferably the core includes iron powder in an amount of at least 20% by weight of the core. It may also include ferro-titanium and ferro-aluminium and other conventional ferro-alloys such as ferro-manganese and ferrosilicon. In addition the core may include alloying elements, such as chromium, molybdenum and nickel, up to a total amount of 20% of the weight of the electrode.

We prefer to use potassium oxide as the alkali metal oxide constituent of the core as it is a very efficient arc stabilizer. It may be incorporated as potassium feldspar or as potassium titanate. The use of potassium titanate in proportions between 1% and 10% by weight of the core is helpful in giving a quiet arc with smooth metal transfer and little loss of weld metal as spatter.

The core may contain the following arc stabilizers, in proportions by weight of the electrode, subject again to the above stated minimum requirements as regards oxides of alkali and alkaline earth metals:

| | |
|---|---|
| Rutile | 4–14% preferably 4.5–8%. |
| Zirconia | 0–7% preferably 0–4%. |
| Iron oxide | 0–11% preferably 2–5%. |
| Feldspar | 0.11% preferably 0–10%. |
| Calcium carbonate | 0–11% preferably 1–6%. |
| Magnesium carbonate | 0–11% preferably 0–2%. |
| Barium carbonate | 0–12% preferably 0–2%. |
| Potassium titanate | 0–4% preferably 0.5–4%. |

The core may also contain 0–4%, preferably 0.5–3%, of calcium fluoride based on the weight of the electrode.

The deoxidiser, which consists of ferrosilicon, ferrotitanium and/or ferroaluminium is preferably present in an amount of 2–4% based on the weight of the electrode. When the electrode is intended to deposit mild steel or low alloy steel weld metal the core will contain 0.6–4%, preferably 1–4%, of manganese based on the weight of the electrode and present as ferromanganese containing not more than 0.05% carbon.

The A.C. power source may be of any conventional type and good results may be obtained by the use of conventional transformers primarily designed for welding with manual electrodes. Any conventional A.C. supply may be used. Thus the power may be derived from the mains through a transformer or may be provided by a suitable A.C. generator. It may be single phase, three phase or derived from two phases or between line and neutral of a three phase supply. The load characteristic of the transformer may be of the drooping, sloping or level type.

In a conventional circuit for manual arc welding, using a 250 volt A.C. supply, the transformer is designed to give an open circuit voltage of 80 volts, and the inductance which is in series with the secondary of the transformer has a value of 0.5 millihenry. As a result the voltage drops when the current is struck to a value of 20–30 volts and the power source has a drooping characteristic. We find that in our process excellent results can be obtained by using a transformer which gives an open circuit voltage of 30–50 volts and an inductance I of 0.02–0.2 millihenry. The voltage then only drops to 20–30 volts when the arc is struck and the characteristic is substantially level, the voltage drop being within the range of 0–0.1 volt per ampere. Transformers designed to give a low open circuit voltage are simple to manufacture, consume less materials and are more efficient in use than conventional welding transformers giving higher open circuit voltages. This gives the advantage of a more favourable power factor.

This can be seen from the following comparison between a conventional A.C. power source for use with a hand electrode with a drooping characteristic and a modified A.C. power source with a level characteristic as just described:

|  | Conventional source | Modified power source |
|---|---|---|
| 1. Open Circuit voltage | Usually 80-100 volts. | Between 30-50 volts. |
| 2. Short circuit current | Usually 1.5 to 2 times welding value. | Between 2 to 13 times welding value. |
| 3. Load current 400 amps | Arc voltage approx. 30. | Arc voltage approx. 28. |
| 4. Power factor | 0.515 lagging | 0.866 lagging. |
| 5. Value of inductance supply frequency 50 c./s. | 0.558 mh | 0.159 mh. |
| 6. K.v.a. required to weld at 400 amps. | 32 k.v.a. | 16 k.v.a. |
| 7. Useful power used in the arc | 12 kw | 11.2 kw. |
| 8. Ratio of k.v.a. to useful power | 37.5% | 70%. |

The appearance of the welds made with the A.C. supply is in no way inferior to that of the welds using a D.C. supply and may even be slightly superior in horizontal vertical fillets where the "toes" of the weld tend to be more even.

The following are examples of electrodes for use in the process according to the invention. In each case the diameter of the electrode is 0.06", the sheath is of rimming quality mild steel containing 0.06% carbon, 0.5% manganese. 0.03% sulphur and 0.03% phosphorus and has a thickness of 0.025". The core constitutes 32% of the weight of the electrode and all proportions given are by weight of the electrode. Electrodes 1-4 deposit mild steel, electrodes 5 and 6 deposit low alloy steel and electrodes 7-10 are suitable for hard facing. Electrode 5 deposits weld metal containing 0.5% molybdenum and electrode 6 deposits weld metal containing 0.5% molybdenum and 2% chromium. The Vickers pyramid hardness of the weld deposits made by electrodes 7-10 are Electrode:

|  | VPN |
|---|---|
| 7 | 250 |
| 8 | 250 |
| 9 | 650 |
| 10 | 300 | of an alkaline earth metal oxide, all said percentages being percentages by weight of the electrode.

2. A process according to claim 1, in which the alkali metal oxide is potassium oxide.

3. A process according to claim 2, in which the potassium oxide is derived from potassium titanate.

4. A process according to claim 1, in which the core contains less than 4% of calcium floride based on the weight of the electrode.

5. A process according to claim 1, in which the deoxidisers are present in an amount of 2-4% based on the weight of the electrode.

6. A process according to claim 1, for the deposition of mind steel or low alloy steel weld metal, in which the core contains 0.1-4%, of manganese based on the weight of the electrode and present as ferromanganese containing not more than 0.05% carbon.

7. A process according to claim 1, wherein the power supply yields an open circuit voltage of 20-30 volts and a voltage drop not exceeding 0.1 volt per ampere.

8. A process as in claim 1 wherein the said arc stabilizers include rutile in an amount less than 14% and a second material chosen from the group consisting of zirconia in an amount less than 7%, iron oxide in an amount less than 11%, feldspar in an amount less than 11%, calcium carbonate in an amount less than 11%, magnesium carbonate in an amount less than 11%, barium carbonate in an amount less than 12%, potassium titanate in an amount less than 4%, and the mixtures thereof, all said amounts being based on the weight of the electrode.

9. A process as in claim 8 wherein said rutile is in an amount from 4.5% to 8%, zirconia is in an amount less than 4%, iron oxide is in an amount from 2% to 5%, feldspar is in an amount less than 10%, calcium carbonate is in an amount from 1% to 6%, magnesium carbonate is in an amount less than 2%, barium carbonate is in an amount less than 2%, and potassium titanate is in an amount from .5% to 4%.

10. A process as in claim 4 wherein said calcium fluoride is in an amount from .5% and 3%.

11. A process as in claim 6 wherein said manganese is in an amount from 1% to 4%.

|  | 1 | 2 | 3 | 4 | 5 | 6 | 7 | 8 | 9 | 10 |
|---|---|---|---|---|---|---|---|---|---|---|
| Percent: |  |  |  |  |  |  |  |  |  |  |
| Iron from sheath and iron powder | 78 | 75.5 | 76.5 | 78 | 76.5 | 77 | 75.5 | 76 | 74.5 | 69 |
| Deoxidisers (FeSi, FeTi, FeAl) | 2 | 2.5 | 2 | 3 | 2.5 | 2.5 | 2.5 | 2.5 | 2 | 2 |
| Ferromanganese (80% Mn and not more than 0.5% C) | 2 | 3 | 2 | 3 | 2.5 | 2.5 | 0.5 |  |  |  |
| Rutile | 7 | 6 | 5 | 5.5 | 8 | 7 | 8 | 7.5 | 8 | 81 |
| Zirconia |  | 1.5 | 5 |  |  |  |  |  |  |  |
| Iron oxide | 2 |  |  | 3.5 |  |  |  |  |  |  |
| Felspar | 5 | 4 |  |  | 1 | 1 | 1 |  |  |  |
| Calcium carbonate | 2 | 4 | 4 | 4 | 6 | 5.5 | 5 | 4 | 2.5 | 4 |
| Magnesium carbonate |  | 1 | 1 | 1 |  |  |  |  |  |  |
| Barium carbonate |  | 1 | 2.5 |  |  |  |  |  |  |  |
| Potassium titanate | 1.5 | 1.5 | 2 | 2 | 2 | 2 | 2.5 | 2.5 | 2.5 | 3 |
| Calcium fluoride | 0.5 |  |  |  | 1 |  |  | 1 |  |  |
| Ferromolybdenum (65-75% Mo) |  |  |  |  | 0.5 | 0.5 | 1 | 1 | 2 |  |
| Ferrochromium (80-90% Cr) |  |  |  |  |  | 2 | 2 | 3 | 5.5 |  |
| Ferromanganese (80% Mn and 6% C) |  |  |  |  |  |  | 2 | 2.5 | 3 | 14 |

What we claim as our invention desire to secure by Letters Patent is:

1. A process of automatic or semiautomatic welding which consists in utilizing in conjunction with $CO_2$ gas shielding and an A.C. power supply at a current density in the range of 20,000 to 120,000 amperes per square inch a continuous tubular electrode having a diameter in the range of 0.03 to 0.11 inch and consisting of a steel sheet enclosing a core containing deoxidizers in an amount of 1-4% and arc stabilizers in an amount of 10-36%, the arc stabilizers including at least 4% of rutile, at least ½% of an alkali metal oxide and at least 2%

References Cited

UNITED STATES PATENTS

| 2,909,778 | 10/1959 | Landis et al. |  |
| 2,820,725 | 1/1958 | Wasserman | 117—206 |
| 2,951,931 | 9/1960 | Danhier | 219—146 |
| 3,051,822 | 8/1962 | Bernard et al. | 219—146 X |

JOSEPH V. TRUHE, Primary Examiner

J. G. SMITH, Assistant Examiner

U.S. Cl. X.R.

219—137, 146